US011075957B2

(12) United States Patent
Lingala et al.

(10) Patent No.: US 11,075,957 B2
(45) Date of Patent: Jul. 27, 2021

(54) ADAPTIVE CYBERSECURITY RING FOR INDUSTRIAL WIRELESS SENSOR NETWORKS

(71) Applicant: HONEYWELL INTERNATIONAL INC., Morris Plains, NJ (US)

(72) Inventors: Prashanth Lingala, Hyderabad (IN); Amol Gandhi, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 244 days.

(21) Appl. No.: 16/125,339

(22) Filed: Sep. 7, 2018

(65) Prior Publication Data

US 2020/0084244 A1 Mar. 12, 2020

(51) Int. Cl.
*H04L 29/06* (2006.01)
*G06F 21/57* (2013.01)
*H04W 12/10* (2021.01)

(52) U.S. Cl.
CPC .......... *H04L 63/205* (2013.01); *H04L 63/105* (2013.01); *H04W 12/10* (2013.01); *H04L 63/162* (2013.01); *H04L 63/166* (2013.01)

(58) Field of Classification Search
CPC .... H04L 63/205; H04L 63/105; G06F 21/577
See application file for complete search history.

(56) References Cited

U.S. PATENT DOCUMENTS

| 6,301,668 | B1 | 10/2001 | Gleichauf et al. | |
|---|---|---|---|---|
| 8,107,397 | B1* | 1/2012 | Bagchi | H04L 9/0822 370/254 |
| 2006/0053491 | A1* | 3/2006 | Khuti | H04L 63/1416 726/23 |
| 2009/0086692 | A1* | 4/2009 | Chen | H04L 67/12 370/338 |
| 2009/0187969 | A1* | 7/2009 | DeFord | H04L 63/20 726/3 |
| 2010/0183153 | A1* | 7/2010 | Cho | H04L 45/123 380/277 |
| 2012/0054650 | A1* | 3/2012 | Bliss | G05B 19/418 715/764 |
| 2012/0066764 | A1* | 3/2012 | Kim | H04L 63/101 726/22 |

(Continued)

*Primary Examiner* — Jason Chiang
(74) *Attorney, Agent, or Firm* — Jetter & Associates, P.A.; Neil R. Jetter

(57) ABSTRACT

A system for providing cybersecurity for an industrial wireless sensor network (IWSN) including a plurality of devices in an industrial processing facility (IPF) that includes a computing device having a processor having an associated memory at one of the plurality of devices configured to implement an adaptive security ring. The adaptive security ring includes considering a plurality of current security considerations selected from a number of wireless hops for a first device of the plurality of devices to a root node in the IWSN, whether the first device is line powered or is battery powered, user' inputs for user defined criticality of the first device, and whether packet replay attacks are present for the first device by checking security headers and security statistics of packets received from other of the devices. Responsive to the current security considerations, a current cybersecurity level is automatically increased or decreased for the first device.

17 Claims, 2 Drawing Sheets

(56) References Cited

U.S. PATENT DOCUMENTS

| | | | |
|---|---|---|---|
| 2013/0031037 A1* | 1/2013 | Brandt | H04L 63/1416 |
| | | | 706/12 |
| 2015/0095479 A1* | 4/2015 | Chen | H04W 4/50 |
| | | | 709/223 |
| 2015/0326582 A1* | 11/2015 | Al-Khowaiter | H04L 63/105 |
| | | | 726/4 |
| 2015/0370235 A1* | 12/2015 | Lloyd | G05B 19/048 |
| | | | 700/79 |
| 2016/0021143 A1* | 1/2016 | Browning | H04L 63/104 |
| | | | 726/1 |
| 2016/0109875 A1* | 4/2016 | Majewski | G05B 19/0426 |
| | | | 700/98 |
| 2016/0234242 A1* | 8/2016 | Knapp | H04L 63/1433 |
| 2016/0357177 A1* | 12/2016 | Chand | G06F 21/6218 |
| 2017/0208086 A1* | 7/2017 | Carpenter | H04L 67/12 |
| 2017/0285704 A1* | 10/2017 | Artman | H05K 7/1492 |
| 2018/0113442 A1* | 4/2018 | Nixon | G05B 19/4184 |

\* cited by examiner

ADAPTIVE CYBERSECURITY RING FOR INDUSTRIAL WIRELESS SENSOR NETWORKS

FIELD

Disclosed embodiments relate to computer network security, more specifically to security arrangements for industrial wireless sensor networks.

BACKGROUND

Cybersecurity is a major concern for customers when it comes to deploying wireless sensor networks and related systems. Given the increasing age of many industrial processing facilities (IPFs) and the dynamic nature of the industrial manufacturing market, intelligent and low-cost industrial automation systems are required to improve the productivity and efficiency of such systems. The collaborative nature of industrial wireless sensor networks (IWSNs) brings several advantages over traditional wired industrial monitoring and control systems, including self-organization, rapid deployment, flexibility, and inherent intelligent-processing capability. In this regard, IWSNs play a vital role in creating a highly reliable and self-healing industrial system that rapidly responds to real-time events with appropriate actions.

Cybersecurity is an essential feature in the design of IWSNs to make the wireless communications safe from external denial-of-service (DoS) attacks and intrusion. IWSNs have special characteristics that make them vulnerable to new cybersecurity attacks. Passive cybersecurity attacks are carried out by eavesdropping on wireless transmissions including traffic analysis or the disclosure of message contents.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize it is difficult to stop eavesdropping of wireless communications in an IWSN for IPFs as it is difficult to contain the signals within the walls of the factory. A first problem ("Problem 1") is thus that although it is generally possible to prevent the eavesdropping within the walls of the factory, it is not possible to prevent the eavesdropping outside the walls of the factory. For a given lower/medium security level (e.g., a message integrity reflected in a Message Integrity Code (MIC) up to 16 bytes for AES-128 and encryption value), there is a growing vulnerability of the IWSN as one moves towards the physical boundaries of the factory. Suppose a user secures the IWSN with a more rugged/higher security level, then it will impact the network lifetime as the battery life of the individual wireless devices is reduced for a higher integrity check and encryption level, and more power is thus required to process data packets received and to transmit data packets.

For example, assume a user wants protect IPF assets 1, 2 and 3 with a higher security level as compared to other IPF assets, such as assets 4 and 5, with the IPF assets being at different device nodes. Accordingly, a second problem ("Problem 2") is that there is no way believed to be known to only protect selected IPF assets with higher security levels as known IWSNs available do not support multiple security levels. At the same time it is not advisable to set all the IPF assets to higher security levels as this tends to drain the batteries of the wireless nodes and thereby the network lifetime, which can critically impact the industrial process which is being monitored. A 3rd problem arises when it is desired to protect both critical data and not critical data in that there is no way believed to be known for the user to protect the critical data with a higher security integrity level and encryption, and non-critical data with a lower security level and encryption in the same IWSN.

One disclosed embodiment comprises a system for providing cybersecurity for an IWSN that includes a plurality of devices configured to run an industrial process in an IPF, where one of the plurality of devices includes a computing device having a processor with an associated memory configured to implement a disclosed adaptive security ring. The adaptive security ring includes starting at least a first device of the plurality of devices at a predetermined default security level, then considering a plurality of current security considerations selected from a number of wireless hops for the first device to a root node in the IWSN, whether the first device is line powered or is battery powered, user' inputs for user defined criticality for the first device, and whether packet replay attacks are present for the first device by checking security headers and security statistics of packets received from other devices in the IPF. Responsive to the current security considerations, a current cybersecurity level is automatically increased or decreased for the first device.

DETAILED DESCRIPTION

Figure 1:
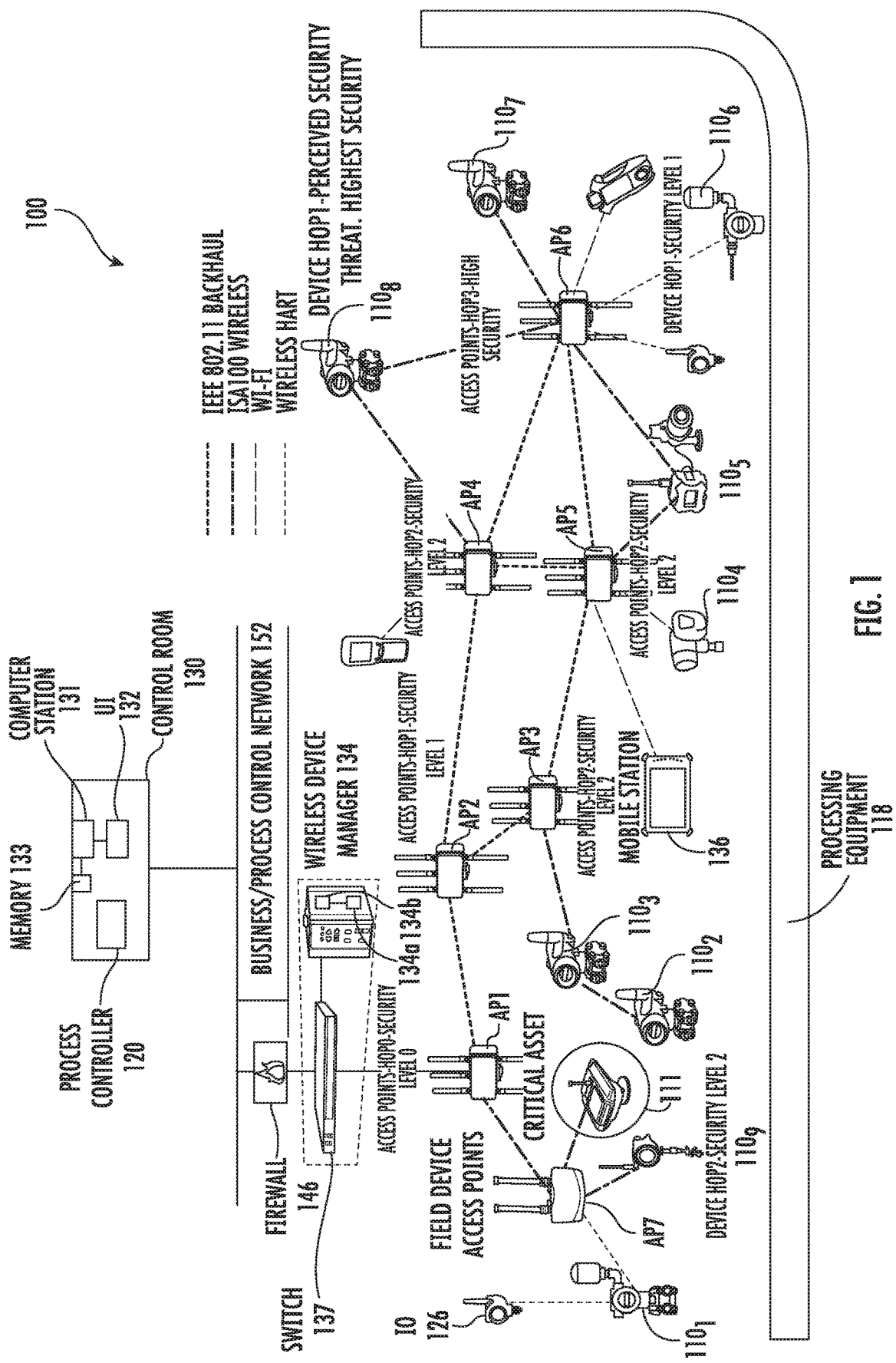
FIG. 1 depicts an IPF configured to communicate as an IWSN implementing a multiprotocol wireless network, with a process controller, IOs, and a field level with field devices showing devices with different security levels along with a user interface (UI) in a control room that an operator can use to monitor and review workings of the disclosed adaptive cybersecurity ring, and can modify the adaptive cybersecurity ring.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

As used herein an industrial process facility runs an industrial process involving a tangible material that disclosed embodiments apply. For example, oil and gas, chemical, beverage, pharmaceutical, pulp and paper manufacturing, petroleum processes, electrical, and water. An industrial process facility is distinct from a data processing system that only performs data manipulations.

This Disclosure recognizes that there are commercially available cybersecurity standards that support multiple security levels. For example, ISA100 is a wireless networking technology standard developed by the International Society of Automation (ISA) that supports Message Integrity Code (MIC)-32 (a 4 byte MIC), MIC-64 (an 8 byte MIC), MIC 128 (a 16 byte MIC), ENC, ENC-MIC-32, ENC-MIC 64, and ENC-MIC-128 at both at the transport layer (TL) and datalink layer (DL). In the Open Systems Interconnection Reference (OSI) model, the DL layer is layer 2 and the TL is layer 4. The data after being segmented in the layer 4 (TL) goes down to layer 3 (network layer) and layer 2 (DL layer) for packetization and framing. There are in total at least 12 security level combinations for ISA100 counting the TL and DL as separate choices. Applications for ISA100 include asset health monitoring and analytics, process monitoring and control and safety alarms. Most current systems use only ENC-MIC-32 at the TL and MIC 32 at the DL to save battery life.

This Disclosure describes a solution to all the above-described problems that uses machine learning referred to herein as an "Adaptive security ring". As used herein an "adaptive security ring" (ASR) is a cybersecurity selection system which adapts to select different security levels at any of the respective devices in the IWSN based on a plurality of current security considerations including user' configuration as well as perceived security threats through machine learning. The ASR considers security considerations including the number of wireless hops of a particular device to a wireless root node in the IWSN, whether the device is line powered or is battery powered, user' inputs regarding user defined criticality of the device, packet replay attacks by checking security headers in the packets received other devices in the IPF, and packets received from other devices having communication and security statistics. The ASR then responsive to the current security considerations can automatically increase or decrease the security level for the device.

The ASR when enabled from a UI generally from a computer station in a control room that starts the devices in the IWSN at a default security level which is a predetermined level that is between minimum and maximum level, and adaptively moves the security levels upward or downward based on one or more current security considerations comprising security threats, packet replay attacks, denial of service, man in the middle, or a rouge access point (AP). A rogue AP is a wireless AP that has been installed on a secure network without explicit authorization from a local network administrator. The ASR changes the security levels at the TL and/or the DL depending on what has been learnt from perceived attacks, and sets the security level, including generally increasing the security level in the case of a current security threat.

FIG. 1 depicts an IPF 100 configured to communicate as an IWSN that implements multiple different wireless protocols, with a process controller 120 shown in a control room 130, IOs shown as IO 126, and a wireless device manager 134 that in this example functions as the system for providing cybersecurity for the IWSN. The wireless device manager 134 includes a processor 134a having an associated memory 134b that can store code for implementing a disclosed ASR. The wireless device manager 134 is shown coupled to the IWSN by a switch 137.

Regarding the management function performed by the wireless device manager 134, users from the wireless device manager's UI 132 can add and commission wireless field devices, APs, etc. Users can perform over-the-air firmware upgrades and provisioning, and an intuitive web-based UI. As a gateway, the wireless device manager 134 handles communication and cybersecurity between wireless field devices, routers and APs. The wireless device manager 134 can host a portfolio of interfaces, including MODBUS, HART, OPC-UA, OPC-DA, and EXPERION CDA, Honeywell ENRAF and Gateway General Client Interface (GCI). The IPF 100 includes a field level with field devices shown as $110_1$, $110_2$, $110_3$ $110_4$, $110_5$, $110_6$, $110_7$, $110_8$, $110_9$ showing the respective field devices with different security levels including some with security level 1 and some with security level 2. The field devices, such as comprising sensors and actuators, are coupled to processing equipment 118 that can comprise for example storage tanks, steam boilers, and distillers.

There is a critical asset shown as a field device 111 in system 100 that is shown circled to indicate its criticality. For example for an oil or gas tank in a petrochemical plant as the processing equipment, the field device 111 can be a tank level gauge. The IPF 100 includes APs for the field devices shown as AP1, AP2, AP3, AP4, AP5, AP6, AP7 with different security levels including some APs with security level 0, some with security level 1, some with security level 2, and some with security level 3, that are generally based on the number of hops measured from the IO 126 which functions as the root wireless node in the IWSN of IPF 100. The APs each function as wireless repeaters. AP7 because it is associated with a user' defined critical asset being field device 111 has the highest security employed despite being only 1 hop (thus not being the furthest from the IO 126 based on the number of hops away) away from IO 126. Field device $110_8$ is also shown as employing the highest security because it is 3 hops away from IO 126. There is a firewall 146 shown between AP1 and the business/process control network 152. In the control room 130 there is shown a computer station 131 having an associated memory 133 with a UI 132 that an operator can use to monitor and review workings of the disclosed ASR and to also modify the ASR. The IWSN network is shown utilizing IEEE 802.11, ISA100, Wi-Fi and Wireless HART, etc., although a single one of these protocols may be used by the IWSN.

Figure 2:
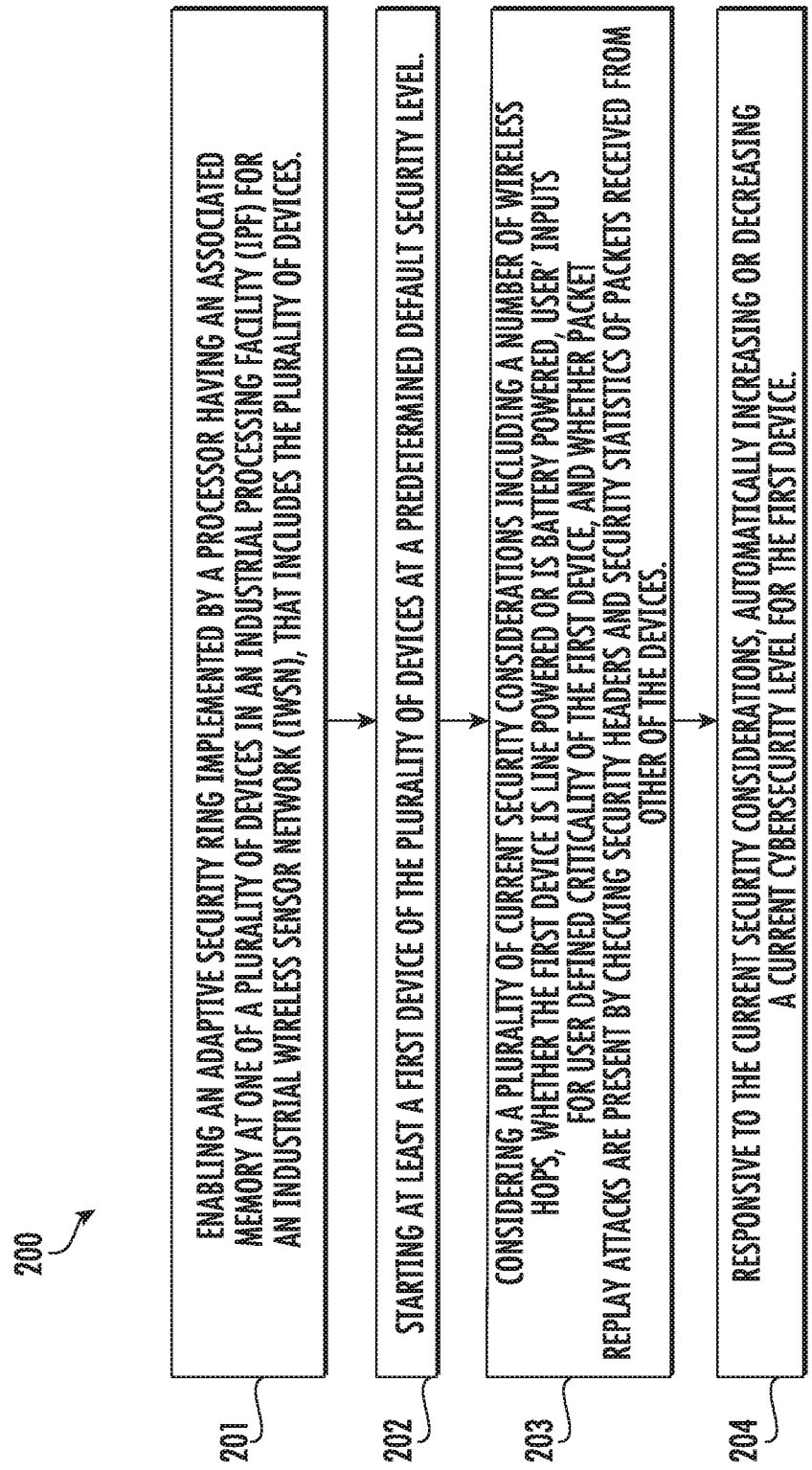
FIG. 2 is a flow chart that shows steps in a method of providing cybersecurity for an IWSN in an IPF, according to an example embodiment.

FIG. 2 is a flow chart for a method 200 of utilizing a disclosed ASR for cyberprotecting devices in an IWSN of an IPF. Step 201 comprises enabling an ASR generally implemented by a processor having an associated memory at one of the plurality of devices in the IWSN, shown by example as the wireless device manager 134 in FIG. 1. The processor can comprise a digital signal processor (DSP), a microcontroller, an application specific integrated circuit (ASIC), a general processor, or any other combination of one or more integrated processing devices. A user at a UI (see UI 132 in FIG. 1) at a computer station (see computer station 131 in FIG. 1) in a control room (see control room 130 in FIG. 1) of the IPF 100 generally performs the enabling of the ASR.

The method may include logic of the ASR for checking whether the ASR is manual or automatic. Manual means for a user specific critical assets, and automatic is for the user specific critical assets and general complete system. If the ASR is manual, system wide changes are performed comprising assigning the encryptions and security message integrity checks (mics) as configured from the user and when set to "apply", it is applied to all interface to all routers and devices or selectively as applied to a particular set of devices.

Step 202 comprises optionally starting at least a first device of the plurality of devices at a predetermined default security level. Step 203 comprises considering a plurality of current security considerations selected from a number of wireless hops for the first device, whether the first device is line powered or is battery powered, user' inputs for user defined criticality of the first device, and whether packet replay attacks are present by checking security headers and security statistics of packets received from other devices in the IPF. Step 204 comprises responsive to the current security considerations, automatically increasing or decreasing a current cybersecurity level for the first device. The system thus has self-learning ability to learn about reply attacks and other security threats. These security levels will generally be set and updated automatically by the network manager shown as a wireless device manger 134 in FIG. 1 to the corresponding device and the device it is communicating with.

Significant disclosed features include self-learning which will increase the security levels based on the number of device hops in the IWSN. The self-learning feature will increase the security levels based on network layer and security layer statistics/threats for specific devices in the network. A user can also select specific devices for higher security levels once the ASR is enabled. The self-learning algorithm which will increase the security levels based on the device's power option, where line powered devices will by default generally have higher security levels. Disclosed features can be adopted in Wireless HART, in case wireless HART supports more security levels in their future standards. Disclosed features are generally applicable to any wireless standard that is supporting 2 or more security levels for authentication and encryption.

Disclosed embodiments can be applied to IWSNs in a variety of IPFs where cybersecurity is a concern. For example, in the oil and gas industry, chemical, beverage, pharmaceutical, pulp and paper manufacturing, petroleum processes, electrical, and water.

Disclosed ASR customers that have IWSNs can secure critical infrastructure from any potential security threats. The ASR helps customize the level of security needed based on physical location of the device (thus the number of hops to reach the root node) to ensure robust IPF operations.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of providing cybersecurity for an industrial wireless sensor network (IWSN) including a plurality of devices configured to run an industrial process in an industrial processing facility (IPF), comprising: enabling an adaptive security ring implemented by a processor having an associated memory at one of the plurality of devices, comprising: considering a plurality of current security considerations based on a number of wireless hops for a first device of the plurality of devices to a root node in the IWSN, whether the first device is line powered or are battery powered, user' inputs for user' defined criticality for the first device, and whether packet replay attacks are present for the first device by checking security headers and security statistics of packets received from other of the plurality of devices, and responsive to the current security considerations, automatically increasing or decreasing a current cybersecurity level for the first device, wherein the adaptive security ring adapts to select from a plurality of different cybersecurity levels for any of the plurality of devices in the IWSN based on a plurality of current security considerations including a user' configuration and perceived cybersecurity threats obtained through machine learning.

2. The method of claim 1, wherein the adaptive security ring is enabled at a user interface (UI) at a computer station located in a control room of the IPF.

3. The method of claim 1, wherein the increasing or decreasing the current cybersecurity level is implemented at both a transport layer and a data link layer of the packets.

4. The method of claim 1, wherein the IWSN simultaneously implements multiple network protocols.

5. The method of claim 1, wherein a total number of the available ones of the cybersecurity levels is at least 3, and the plurality of devices include at least one device in each of the 3 cybersecurity levels.

6. The method of claim 1, wherein the root node comprises a wireless input/output (IO) device.

7. The method of claim 1, wherein the plurality of devices include field devices comprising sensor and actuators and wireless Access Points (APs).

8. A system for providing cybersecurity for an industrial wireless sensor network (IWSN) including a plurality of devices configured to run an industrial process in an industrial processing facility (IPF), comprising: a computing device comprising a processor having an associated memory at one of the plurality of devices that is configured to implement an adaptive security ring, the adaptive security ring comprising: considering a plurality of current security considerations based on a number of wireless hops for at least a first device of the plurality of devices to a root node in the IWSN, whether the first device is line powered or is battery powered, user inputs' for user defined criticality for the first device, and whether packet replay attacks are present for the first device by checking security headers and security statistics of packets received from other of the plurality of devices, and responsive to the current security considerations, automatically increasing or decreasing a current cybersecurity level for the first device wherein the adaptive security ring adapts to select from a plurality of different cybersecurity levels for any of the plurality of devices in the IWSN based on a plurality of current security considerations including a user' configuration and perceived cybersecurity threats obtained through machine learning.

9. The system of claim 8, wherein the increasing or decreasing the current cybersecurity level is implemented at both a transport layer and a data link layer of the packets.

10. The system of claim 8, wherein the IWSN simultaneously implements multiple network protocols.

11. The system of claim 8, wherein a total number of the available ones of the cybersecurity levels is at least 3, and the plurality of devices include at least one device in each of the 3 cybersecurity levels.

12. The system of claim 8, wherein the root node comprises a wireless input/output (IO) device.

13. The system of claim 8, wherein the plurality of devices include field devices comprising sensor and actuators and wireless Access Points (APs).

14. A non-transitory, computer-readable medium storing one or more executable instructions that, when executed by one or more processors, cause the one or more processors to provide cybersecurity for an industrial wireless sensor network (IWSN) including a plurality of devices configured to run an industrial process in an industrial processing facility (IPF) to: enable an adaptive security ring implemented the one or more processors having an associated memory at one of the plurality of devices, comprising: considering a plurality of current security considerations based on a number of wireless hops for a first device of the plurality of devices to a root node in the IWSN, whether the first device is line powered or are battery powered, user' inputs for user' defined criticality for the first device, and whether packet replay attacks are present for the first device by checking security headers and security statistics of packets received from other of the plurality of devices, and responsive to the current security considerations, automatically increasing or decreasing a current cybersecurity level at both a transport layer and a data link layer of the packets for the first device wherein the adaptive security ring adapts to select from a plurality of different cybersecurity levels for any of the plurality of devices in the IWSN based on a plurality of current security considerations including a user' configuration and perceived cybersecurity threats obtained through machine learning.

15. The non-transitory computer readable medium of claim 14, wherein the adaptive security ring is enabled at a user interface (UI) at a computer station located in a control room of the IPF.

16. The non-transitory computer readable medium of claim 14, wherein the IWSN simultaneously implements multiple network protocols.

17. The non-transitory computer readable medium of claim 14, wherein a total number of the available ones of the cybersecurity levels is at least 3, and the plurality of devices include at least one device in each of the 3 cybersecurity levels.

\* \* \* \* \*